(12) United States Patent
Kroupa et al.

(10) Patent No.: US 7,530,365 B2
(45) Date of Patent: May 12, 2009

(54) SURGE PREVENTION DEVICE

(75) Inventors: Kevin D. Kroupa, Ballwin, MO (US); William J. Kullmann, St. Louis, MO (US)

(73) Assignee: Allied Healthcare Products, Inc., St. Louis, MO (US)

( * ) Notice: Subject to any disclaimer, the term of this patent is extended or adjusted under 35 U.S.C. 154(b) by 0 days.

(21) Appl. No.: 11/652,150

(22) Filed: Jan. 11, 2007

(65) Prior Publication Data

US 2007/0227601 A1 Oct. 4, 2007

Related U.S. Application Data

(63) Continuation of application No. 11/119,795, filed on May 3, 2005, now Pat. No. 7,174,909, which is a continuation of application No. 10/188,366, filed on Jul. 3, 2002, now Pat. No. 6,910,504, which is a continuation-in-part of application No. 10/034,250, filed on Jan. 3, 2002, now Pat. No. 6,901,962, which is a continuation-in-part of application No. 09/374,130, filed on Aug. 9, 1999, now Pat. No. 6,622,743.

(51) Int. Cl.
*F17C 13/04* (2006.01)
*F16K 1/00* (2006.01)

(52) U.S. Cl. ............................. 137/1; 137/636; 137/595

(58) Field of Classification Search ................. 137/636, 137/595, 1, 862
See application file for complete search history.

(56) References Cited

U.S. PATENT DOCUMENTS

| 98,688 A | 1/1870 | Gould |
|---|---|---|
| 401,647 A | 4/1889 | Foster |
| 491,166 A | 2/1893 | Gold |
| 723,803 A | 3/1903 | Abeling |
| 927,683 A | 7/1909 | Schuermann |
| 1,064,565 A | 6/1913 | Thurber |
| 1,230,499 A | 6/1917 | Matheson |
| 1,432,527 A | 10/1922 | Burdett |

(Continued)

FOREIGN PATENT DOCUMENTS

DE 200 02 223 U1 3/2000

(Continued)

*Primary Examiner*—Kevin L Lee
(74) *Attorney, Agent, or Firm*—Dickstein Shapiro LLP (57) ABSTRACT

A surge prevention valve may be used to prevent the formation of an initial surge of high pressure. The valve may be located, for example, between a high pressure gas cylinder and a medical pressure regulator. The valve is provided with first and second valves located within a housing and integrating a pressurization orifice. The initial opening of the valve in an axial direction enables gas to flow through the pressurization orifice at a first flow rate. The full opening of the valve in the axial direction enables the gas to flow through the second valve at a second flow rate, which is much higher than the first flow rate. The controlled pressurization of the gas through the orifice delays the time during which the gas reaches full recompression. The valve may be further provided with a vent for venting pressurized gas away from a nominally closed top surface of the lower valve element. The valve may be also provided with a valve inlet tube extending into a gas cylinder to prevent contaminants, particles and/or impurities from entering the valve.

5 Claims, 9 Drawing Sheets

U.S. PATENT DOCUMENTS

| | | | |
|---|---|---|---|
| 1,716,183 A | 6/1929 | Possons |
| 1,833,653 A | 11/1931 | Martin |
| 1,870,293 A | 8/1932 | Miller |
| 1,875,679 A | 9/1932 | Thompson |
| 2,202,971 A | 6/1940 | Vedoe |
| 2,217,842 A | 10/1940 | Lamar |
| 2,360,612 A | 10/1944 | Ludeman |
| 2,446,626 A | 8/1948 | Baxter et al. |
| 2,635,846 A | 4/1953 | Smith |
| 2,864,400 A | 12/1958 | Wiegel |
| 3,001,551 A | 9/1961 | Wyser |
| 3,012,584 A | 12/1961 | Perow et al. |
| 3,111,141 A | 11/1963 | Hughes |
| 3,117,595 A | 1/1964 | Broecker et al. |
| 3,211,419 A | 10/1965 | Klinger-Lohr |
| 3,291,445 A | 12/1966 | Lundberg |
| 3,347,270 A | 10/1967 | Cranage |
| 3,348,561 A | 10/1967 | MacLennan |
| 3,422,850 A | 1/1969 | Caldwell |
| 3,624,753 A | 11/1971 | Brumm |
| 3,841,353 A | 10/1974 | Acomb |
| 4,549,716 A | 10/1985 | Warren |
| 4,615,354 A | 10/1986 | Bianchi |
| 4,672,203 A | 6/1987 | Holkeboer |
| 4,799,646 A * | 1/1989 | Rollett ................ 251/324 |
| 4,867,201 A | 9/1989 | Carten |
| 4,982,757 A | 1/1991 | Ohasi et al. |
| 5,036,876 A | 8/1991 | Jernberg |
| 5,037,066 A | 8/1991 | Kerger et al. |
| 5,141,027 A | 8/1992 | Magnasco |
| 5,145,152 A | 9/1992 | Komuro et al. |
| 5,172,722 A | 12/1992 | Nishimura |
| 5,215,286 A | 6/1993 | Kolenc |
| 5,411,059 A | 5/1995 | Sever et al. |
| 5,678,602 A | 10/1997 | Cannet et al. |
| 5,704,397 A | 1/1998 | Lu |
| 5,820,102 A | 10/1998 | Borland |
| 6,089,027 A | 7/2000 | Wang et al. |
| 6,125,846 A | 10/2000 | Bathe |
| 6,607,007 B1 * | 8/2003 | Hull et al. ............ 137/613 |
| 2001/0032678 A1 | 10/2001 | Bircann et al. |

FOREIGN PATENT DOCUMENTS

| | | |
|---|---|---|
| GB | 973914 | 11/1964 |
| WO | WO 01/11277 A1 | 2/2001 |

* cited by examiner

FIG.11

SURGE PREVENTION DEVICE

CROSS REFERENCE TO RELATED APPLICATIONS

The present application is a continuation of U.S. patent application Ser. No. 11/119,795, filed on May 3, 2005 now U.S. Pat. No. 7,174,909, which in turn is a continuation of U.S. patent application Ser. No. 10/188,366, filed on Jul. 3, 2002 (now U.S. Pat. No. 6,910,504), which in turn is a continuation-in-part of U.S. patent application Ser. No. 10/034,250, filed Jan. 3, 2002 (now U.S. Pat. No. 6,901,962), which is a continuation-in-part of U.S. patent application Ser. No. 09/374,130, filed Aug. 9, 1999 (now U.S. Pat. No. 6,622,743), the disclosures of which are incorporated by reference herein.

BACKGROUND OF THE INVENTION

The present invention relates generally to a device for handling a gas, such as oxygen and nitrous oxide, under high pressure. The present invention also relates to a valve for controlling the flow of gas and to a system for reducing or preventing high pressure surge.

Known high pressure oxygen delivery systems are provided with an oxygen cylinder, a cylinder valve and a pressure regulator. The oxygen cylinder may be charged with pure oxygen at a pressure of two thousand two hundred pounds per square inch (psi) or more in the United States and over three thousand psi in other countries. The valve is attached to the cylinder to stop the flow of oxygen to the regulator. The pressure regulator is designed to reduce the tank pressure to under two hundred psi. Most pressure regulators in the United States reduce tank pressure to approximately fifty psi. Typical pressure regulators in Europe reduce tank pressure to approximately sixty psi.

When the valves in the known oxygen systems are opened rapidly, undesirable high pressure surges may be applied to the pressure regulator. There is a need in the art for preventing such high pressure surges, as well as increases in tie temperature of die gas which may result in ignition. A similar problem may occur with respect to nitrous oxide supplied, for example, for dental procedures.

The risk of oxygen regulator failure may be higher for portable oxygen systems that are used in adverse environments and/or by untrained personnel. Portable oxygen systems are used for emergency oxygen delivery at accident sites; for other medical emergencies, such as heart attacks; and for transporting patients. Homecare patients who use oxygen concentrators as the main source of oxygen for oxygen therapy are required to have standby oxygen cylinders in case of power failures. Oxygen cylinders are also used to provide homecare patients with mobility outside the house. There is a need in the art for a valve that can be used easily in such portable systems and that reduces or eliminates the occurrence of high pressure surges. Other uses include hospitals, where oxygen cylinders are used to transport patients. They are also used as emergency backup systems.

Known surge suppression devices are illustrated in U.S. Pat. No. 3,841,353 (Acomb), U.S. Pat. No. 2,367,662 (Baxter et al.), and U.S. Pat. No. 4,172,468 (Ruus). These devices all suffer from one or more of the following drawbacks: relatively massive pistons resulting in slower response times, relatively elongated bodies, complicated construction resulting in increased cost, or construction preventing positioning of the devices in different locations in existing systems.

Acomb discloses an anti-surge oxygen cylinder valve in which the surge-suppression device is integrated with the cylinder valve. The device referred to by Acomb requires a force opposed to a spring force to function. In the Acomb device, the opposing force is provided by a stem connected to the valve handle. Additionally, if the bleeder orifice becomes plugged, the valve does not allow flow, and the gas supply is not available for use. In that case, the user may interpret the tank to be empty when it is full, with the danger that such a misunderstanding brings.

Baxter discloses a pressure shock absorber for a welding system. Baxter refers to a piston that is elongated with a bore through the center. The elongated piston results in an increased moment of inertia that increases the time in which the piston reacts to a pressure surge. The long bore results in necessarily tighter tolerances for controlling the gas flow rate through the bore. In addition, the placement of the spring abutting the elongated piston results in a relatively large device.

Ruus discloses a pressure shock absorber for an oxygen-regulator supply system with an elongated, two-part piston. The elongate construction of the piston results in an increased moment of inertia that increases the time required for the piston to react to a pressure surge. The two-part piston results in increased complexity and manufacturing cost. Also in this device, if the restricted passageway becomes plugged, no flow is allowed and the device suffers from the same potential for user misinterpretation as the Acomb device.

SUMMARY OF INVENTION

The present invention overcomes to a great extent the deficiencies of the prior art by providing a device that has a first flow path for flowing gas at a first flow rate, a second flow path for flowing gas at a greater flow rate, and a handle that moves in a first direction to open the first flow path and enable opening of the second flow path, and in a second direction to open the second flow path. In a preferred embodiment of the invention, the device may be a surge prevention valve.

According to one aspect of the invention, the handle moves in an axial direction to open the first flow path, and in a rotational direction to open the second flow path. In a preferred embodiment of the invention, the axial motion of the handle may be required to enable opening of the second flow path. The present invention should not be limited, however, to the preferred embodiments shown and described in detail herein.

According to another aspect of the invention, a spring may be used to bias the handle member in a direction opposite to the first direction. In addition, an engageable torque unit may be employed to transmit torque from the handle to open the second flow path. In a preferred embodiment of the invention, the spring is compressed to engage the torque unit.

The present invention also relates to a surge prevention valve, such as a valve for use with a high pressure gas cylinder. The surge prevention valve may have a housing with an inlet and an outlet. A seal unit may be used to close the flow path from the inlet to the outlet, and a bleed passageway may be provided in the seal unit. The valve also may have an actuator for opening the bleed pathway and for moving the seal unit to open the main flow path.

If desired, the seal unit may be threaded into the housing. With this construction, the actuator may be used to threadedly move the seal unit toward and away from the valve seat to close and open the main flow path. In addition, a valve rod may be provided for closing the bleed passageway. The valve rod may be slidably located within the seal unit.

The present invention also relates to a method of operating a high pressure valve. The method includes the steps of: (1)

moving a handle in an enabling direction to cause gas to flow through a first path at a first flow rate; and then (2) moving the handle in a second direction to cause gas to flow through a second path at a much greater flow rate. The method also may include the step of closing the valve. According to a preferred embodiment of the invention, the method may involve flowing gas, such as oxygen or nitrous oxide, through a pressure regulator to a user or to an intended device (such as a respirator). The method may be used to gradually increase the flow rate into the regulator and to prevent the formation of a high pressure surge in the system.

According to another preferred embodiment of the present invention, a method of opening a valve includes the steps of: (1) moving a handle button, within the handle, in an enabling direction to cause gas to flow through a first path at a first flow rate; and then (2) moving the entire handle in a second direction to cause gas to flow through a second path at a much greater flow rate. According to one aspect of the invention, the enabling direction may be an axial direction, and the second direction may be a rotational direction.

The present invention further relates to a surge prevention dual-port (or dual-path) valve, which is provided with first and second valves located within a housing and integrating a pressurization orifice. The initial opening of the dual-port (or dual-path) valve in an axial direction enables a first flow of gas to flow through the pressurization orifice at a first flow rate. The full opening of the dual-port (or dual-path) valve enables a second flow of gas to flow through the second valve at a second flow rate which is higher than the first flow rate. The controlled pressurization of the gas through the pressurization control orifice delays the time in which the gas reaches full recompression. This, in turn, allows the heat generated by the near adiabatic process of the recompression of the gas to be dispersed. This way, high pressure surges are prevented, the heat during gas recompression is dispersed and excessive heating is avoided. The present invention also relates to a method of operating the dual-port (or dual-path) valve.

In a preferred embodiment of the invention, the device has two separate ports or seats, to define two respective flow paths. The first port/seat is a bleed port that is sized to pressurize an attached oxygen regulator in greater than 0.250 seconds. The first port/seat is opened during the initial actuation of the valve. The second (main) port/seat is opened during the continuing actuation of the valve. If desired, the device may be constructed to require enough motion so that, without the use of a mechanical drive system, the valve cannot be opened fast enough to override the bleed function.

According to another aspect of the invention, the main port may be held in place by a spring (such as a coil compression spring) surrounding the actuator) that is sized to overcome the source of pressure and to maintain a gas-tight seal on the main port. According to this aspect of the invention, during the bleed portion of the valve actuation process, the main port is not influenced by the actuating stem.

According to yet another aspect of the invention, the main port is opened as the actuating stem re-engages the main seat carrier by means of a stop which then allows the seat carrier to be driven open against the force of the spring (by further rotation of the actuator). In a preferred embodiment of the invention, the spring is compressed as the seat carrier is driven open.

In yet another embodiment of the invention, a surge prevention dual-port (or dual-path) valve provided with first and second valves located within a housing and integrating a pressurization orifice is further provided with one or more sealing grooves and at least one vent orifice for venting pressurized oxygen away from a top surface of the lower valve element.

In another embodiment of the invention, a gas supply system is provided with a valve system having a valve inlet tube extending into a gas cylinder to prevent particles and/or impurities from entering the valve system.

These and other objects and advantages of the invention may be best understood with reference to the following detailed description of preferred embodiments of the invention, the appended claims and the several drawings attached hereto.

DETAILED DESCRIPTION OF PREFERRED EMBODIMENTS

Figure 1:
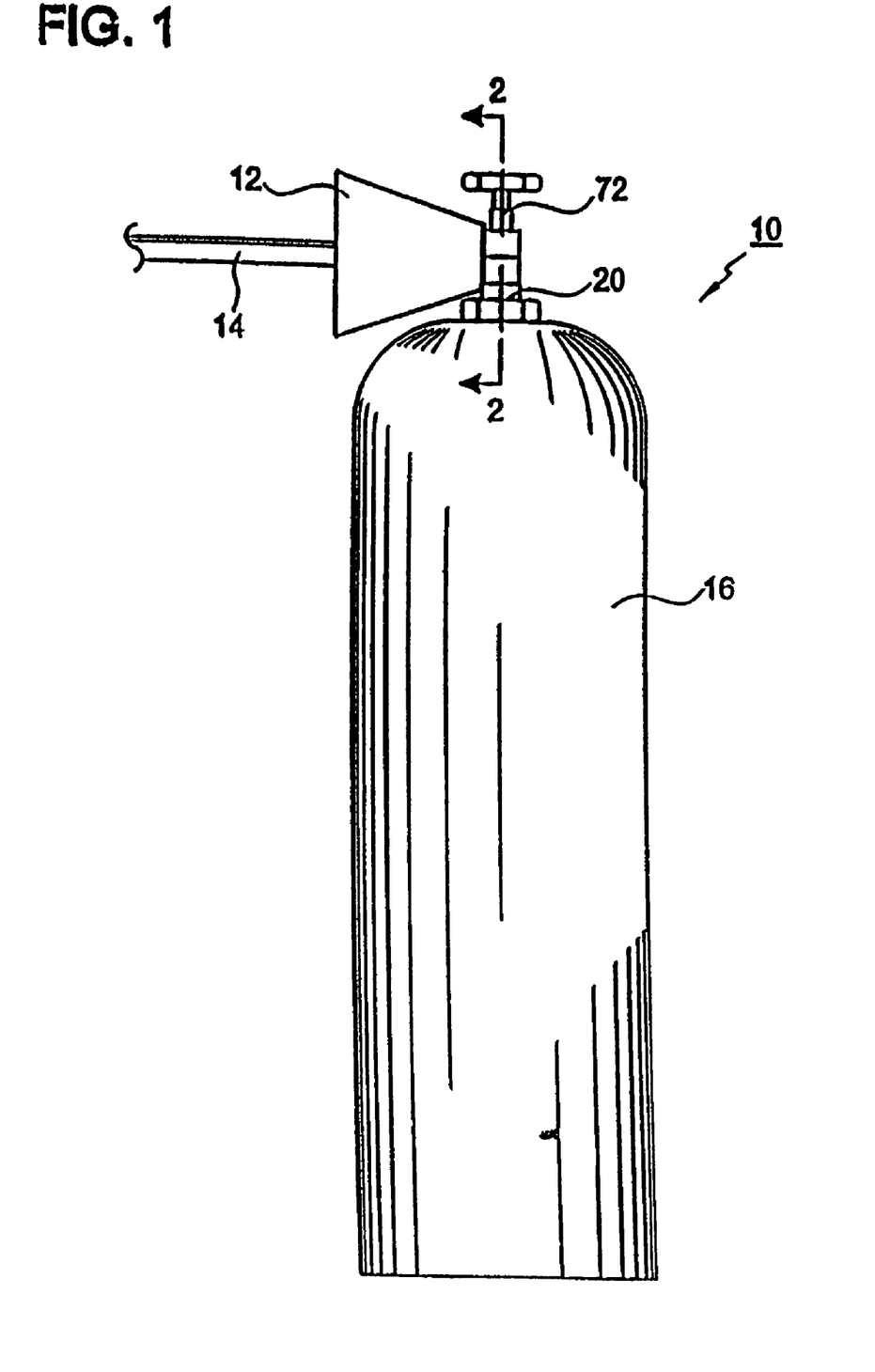
FIG. 1 is a side view of an oxygen supply system constructed in accordance with a preferred embodiment of the invention.

Referring now to the drawings, where like elements are designated by like reference numerals, there is shown in FIG. 1 an oxygen supply system 10 constructed in accordance with a preferred embodiment of the present invention. A detailed description of the illustrated system 10 is provided below. The present invention should not be limited, however, to the specific features of the illustrated system 10.

Referring now to FIG. 1, the oxygen supply system 10 includes a pressure regulator 12, a conduit 14 for flowing oxygen from the pressure regulator 12 to a patient (not illustrated), a source of oxygen 16, and a post valve 20 for preventing oxygen from flowing out of the source 16. The source 16 may be an oxygen cylinder, for example. As discussed in more detail below, the valve 20 may be arranged to prevent a high pressure surge from occurring in the pressure regulator 12 when the valve 20 is opened. In addition to oxygen, the present invention may be also used to handle nitrous oxide and other concentrated oxidizing agents, as well as other gas combinations used in the industry. The present invention may also be used in systems other than medical systems. For example, the present invention may be applicable to oxygen welding equipment.

Figure 2:
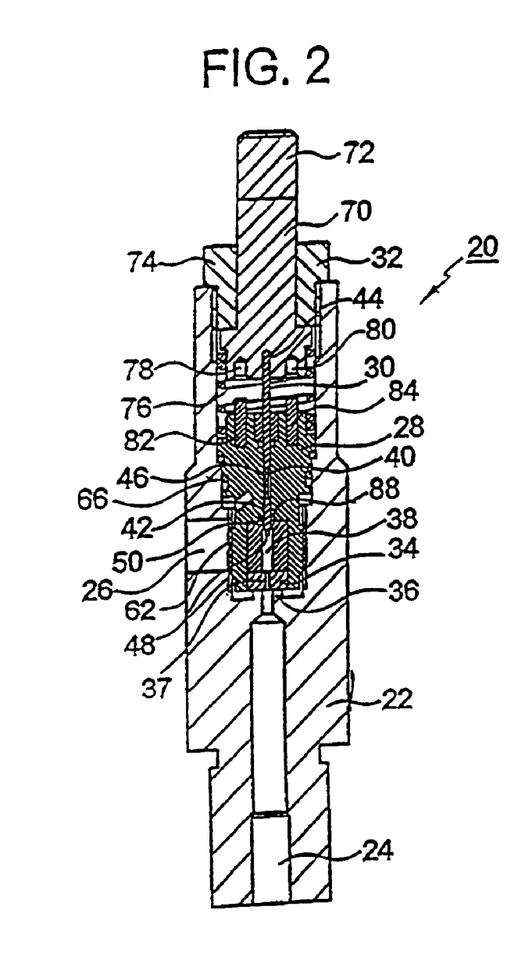
FIG. 2 is a cross-sectional view of a surge prevention valve for the system of FIG. 1, taken along the line 2-2 of FIG. 1.

Referring now to FIG. 2, the valve 20 includes a housing 22 having an inlet 24 and an outlet 26. The inlet 24 may be connected to the oxygen source 16. The outlet 26 may be connected to the pressure regulator 12. In addition, the valve 20 includes a seal unit 28, a valve rod 30, and an actuator unit 32. The seal unit 28 may have an annular elastomeric seal pad 34 for sealing against a valve seat 36. A passageway 37 may be provided to allow oxygen to flow through the pad 34 and into a first bypass space 38 within the seal unit 28. The seal unit 28 also has a second bypass space 40 and a bleed passageway 42.

The upper end 44 of the valve rod 30 is fixed within the actuator unit 32. The lower portion of the valve rod 30 is slidably located within the second bypass space 40. The valve rod 30 may have a reduced diameter portion 46 and a conical lower end 48. Except for the reduced diameter portion 46 and the lower end 48, the remainder of the valve rod 30 may have a circular cross-section with a substantially constant diameter. The cross-sectional configuration of the valve rod 30 is such that an upper opening 50 of the first bypass space 38 is sealed by the lower end 48 of the rod 30 in the position shown in FIG. 2.

Figure 3:
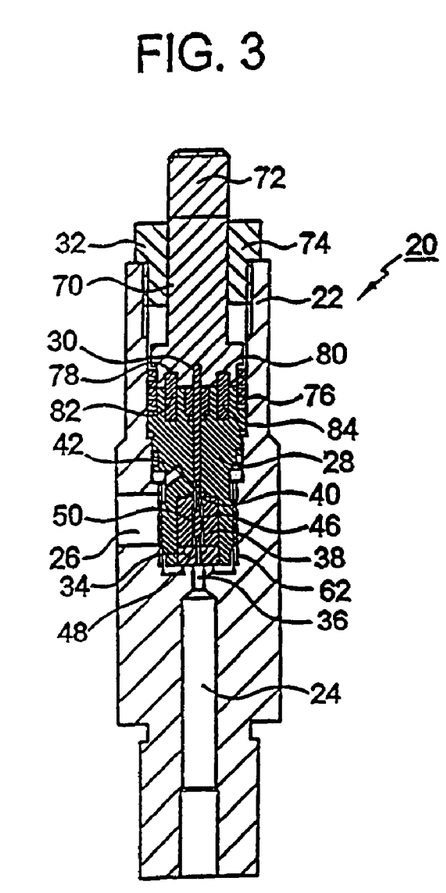
FIG. 3 is another cross-sectional view of the surge prevention valve of FIG. 2, at a subsequent stage of operation.

As discussed in more detail below, the valve rod 30 may be moved down and through the seal unit 28 to the position shown in FIG. 3. In the FIG. 3 position, the reduced diameter portion 46 is located in the upper opening 50 of the first bypass space 38. The cross-sectional area of the reduced diameter portion 46 is less than that of the upper opening 50. Consequently, oxygen may flow through the upper opening 50 when the valve rod 30 is in the FIG. 3 position.

The seal unit 28 is connected to the housing 22 by suitable threads 62. The threads 62 are arranged such that rotating the seal unit 28 with respect to the housing 22 in a first direction moves the seal pad 34 into sealing engagement with the valve seat 36. Rotating the seal unit 28 in the opposite direction causes the seal pad 34 to move away from the valve seat 36 to the open position shown in FIG. 4. In the open position, oxygen is allowed to flow through the valve seat 36, around the seal unit 28 in the direction of arrow 64 and into the outlet 26. An o-ring 66 or other suitable seal may be provided between the seal unit 28 and the housing 22 for preventing oxygen from flowing around the seal unit 28 above the outlet 26.

The actuator unit 32 has a piston unit 70, a handle 72 fixed to the piston unit 70, and a cover 74. The piston unit 70 is slidably located in the cover 74. The piston unit 70 is also allowed to rotate within the cover 74 as described in more detail below. The piston unit 70 is biased upwardly (away from the seal unit 28) by a coil spring 76. The cover 74 may be threaded into the housing 22, if desired.

A torque unit is formed by openings 78, 80 formed in the piston unit 70 and pins 82, 84 fixed with respect to the seal unit 28. As shown in FIG. 3, the pins 82, 84 may be received within the openings 78, 80 when the piston unit 70 is pushed downwardly against the bias of the spring 76. When the pins 82, 84 are received within the openings 78, 80, a torque applied to the handle 72 may be transmitted to the seal unit 28. Thus, a torque may be manually applied to the handle 72 in a first direction to cause the seal unit 28 to move further down into the housing 22 to press the seal pad 34 into the sealed position shown in FIG. 2. In addition, a torque may be applied in the opposite direction to threadedly move the seal pad 34 away from the valve seat 36 to the open position shown in FIG. 4.

The present invention should not be limited to the specific features and instrumentalities of the surge prevention valve 20 described and shown herein. Thus, for example, the torque unit may be formed by openings in the seal unit 28 and pins fixed to the piston unit 70, and a variety of other devices and mechanisms may be used to practice the present invention.

Thus, the valve 20 is closed in the position shown in FIG. 2. In the closed position, oxygen cannot flow between the seal pad 34 and the valve seat 36. In addition, in the closed position, the valve rod 30 seals the upper opening 50 of the first bypass space 38, such that oxygen cannot flow into the second bypass space 40. A suitable o-ring 88 may be provided to form a gas-tight seal against the valve rod 30 in the upper opening 50, if desired.

Figure 4:
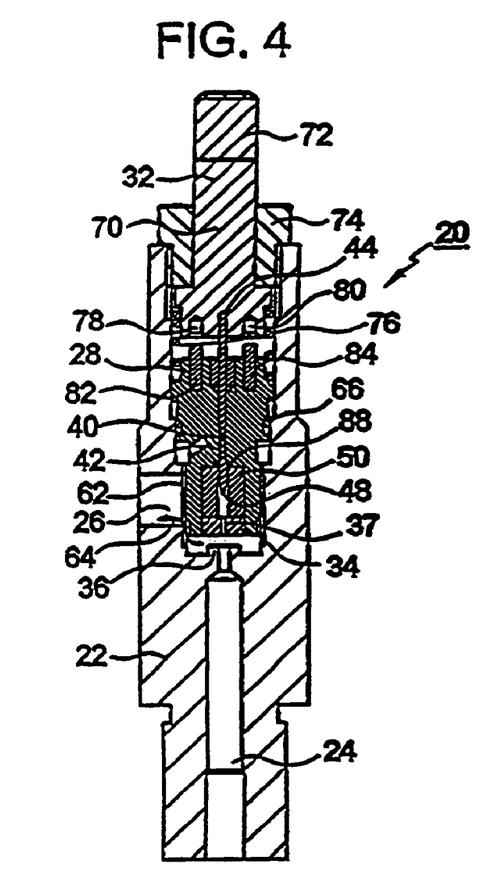
FIG. 4 is yet another cross-sectional view of the surge prevention valve of FIG. 2, at yet another stage of operation.

The valve 20 is open in the position shown in FIG. 4. In the open position, as mentioned above, oxygen can flow through the valve seat 36, around the seal unit 28 in the direction of arrow 64, and through the valve outlet 26. To move the valve 20 from the closed position to the open position, the user first pushes down manually on the handle 72, against the bias of the spring 76, until the pins 82, 84 are located in the openings 78, 80. Pushing down on the handle 72 causes the piston unit 72 to move axially toward the seal unit 28. Then the user applies torque to the handle 72 in an opening rotational direction to threadedly rotate the seal unit 28 away from the valve seat 36. The torque is transmitted through the piston unit 70 and through the torque unit 78-84 to rotate the threaded seal unit 28. In the illustrated arrangement, the seal unit 28 cannot be rotated by the handle 72 unless the torque unit 78-84 is engaged, with the spring 76 in the compressed position shown in FIG. 3. The torque unit 78-84 is engaged to enable rotation of the seal unit 28.

Pushing down on the handle 72 to engage the torque unit 78-84 causes the reduced diameter portion 46 of the valve rod 30 to move into the upper opening 50 of the first bypass space 38. When the reduced diameter portion 46 is in the upper opening 50, oxygen may flow into the second bypass space 40 and through the bleed passageway 42. Oxygen can start to flow through the upper opening 50 while the handle 72 is moving downwardly, before the torque unit 78-84 is filly engaged. In the illustrated arrangement, the handle 72 must be moved to the intermediate FIG. 3 position before the seal unit 28 can be threadedly lifted from the valve seat 36. Opening the valve 20 requires a two-step sequential push-then-twist operation much like the two-step operation required to open safety caps on medicine bottles. If the user does not push down on the handle 72, the piston unit 70 merely rotates within the cover 74 without engaging the seal unit 28. However, this invention is not limited to the preferred embodiment discussed herein.

Consequently, the illustrated valve 20 allows oxygen to bleed into the outlet 26 through the bleed passageway 42 before the seal pad 34 is moved away from the valve seat 36. The small amount of oxygen that bleeds through the restricted passageway 42 during the short time required to engage the torque unit 78-84 may be sufficient to prevent a high pressure surge from developing in the system 10 when the valve 20 is subsequently opened. Thus, the regulator 12 (FIG. 1) may be filled at a relatively slow, controlled rate before a fill flow of high pressure oxygen is allowed through the valve 20. The oxygen flow rate through the valve seat 36 in the valve open position (FIG. 4) may be much greater than the flow rate through the bleed passageway 42 in the intermediate position shown in FIG. 3.

In the preferred method of operation, the user will first push handle 72 until the pressure stabilizes in the valve 20. This will open the first flow path 38 and allow oxygen to flow at a reduced rate. The time it takes to push the handle 72 down to enable opening of the valve 20 may be sufficient for the desired gradual pressurization of the regulator 12. The ability of the valve 20 to bleed sufficient oxygen into the outlet 26 in the available time may be controlled, for example, by selecting a suitable cross-sectional area for the bleed passageway 42. The bleed passageway 42 may be formed by drilling the desired opening into the seal unit 28, if desired. Larger or smaller drills may form larger or smaller bleed passageways.

If the user intends to bypass the preferred method of operation or if the first bypass space 38 or bleed passageway 42 should become clogged, there will still be an added safety factor as long as the user slowly twists the handle 72. Consequently, if desired, the user may be instructed to twist the handle 72 slowly. If such instructions regarding the twisting of the handle 72 are properly followed, the valve 20 may still prevent a high pressure surge in the regulator 12 even without the assistance of the first bypass space 38 or bleed passageway 42. The present invention should not be limited, however, to the specific valve 34, 36 and bleed passageway 42 arrangement shown and described in detail herein.

In the open position shown in FIG. 4, substantially all of the oxygen flowing through the valve 20 travels in the direction of arrow 64 and not through the bleed passageway 42. Consequently, the bleed passageway 42 does not tend to become occluded by small contaminant particles entrained in the gas flow. If the bleed passageway 42 becomes plugged, the valve 20 will still be operable so that oxygen is still supplied to the intended operative device, such as a face mask for the patient, or a cannula inserted into the patient.

To close the valve 20, the user pushes down on the handle 72, against the bias of the spring 76, to engage the torque unit 78-84. Then, while the spring 76 is compressed, the user manually twists the handle 72 to threadedly move the seal unit 28 back into sealing contact with the valve seat 36. Then the downward pressure on the handle 72 is released, such that the spring 76 draws the end 48 of the valve rod 30 back into a sealed position within the upper opening 50 of the first bypass space 38.

Figure 5:
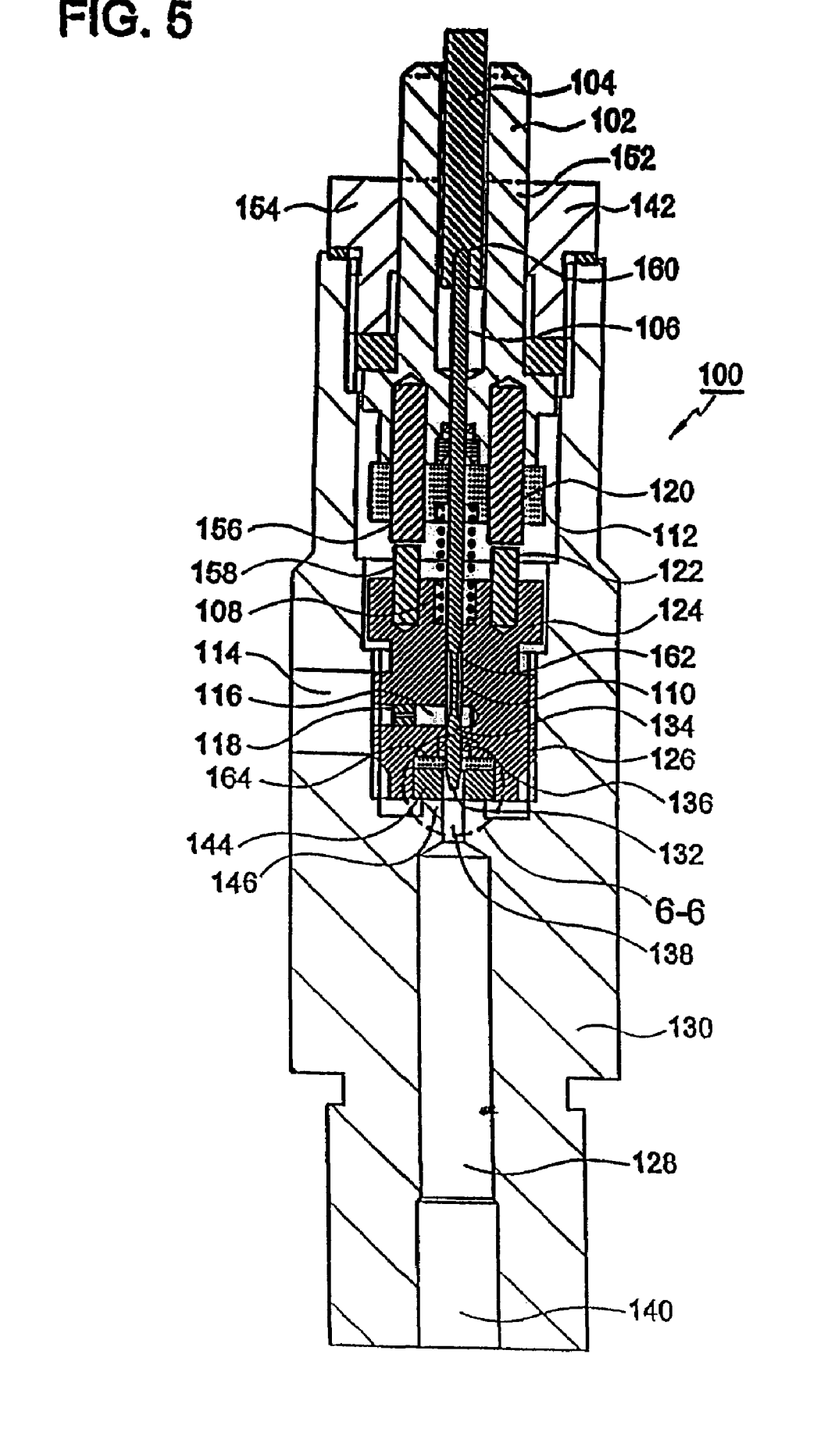
FIG. 5 is a cross sectional view of a surge prevention valve constructed in accordance with another preferred embodiment of the invention.

FIG. 5 illustrates a valve 100 constructed in accordance with another embodiment of the present invention which includes a housing 130 having an inlet 140 and an outlet 114. The inlet 140 may be connected to the oxygen source 16. The outlet 114 may be connected to a pressure regulator 12. In addition, the valve 100 includes a seal unit 124, a valve rod 106, and an actuator unit 142. The seal unit 124 may have an annular elastomeric seal pad 144 for sealing against a valve seat 146. A first bypass 138 is provided to allow oxygen to flow through the pad 144 to the seal unit 124. The seal unit 124 also has a bleed passageway 118.

Figure 6:
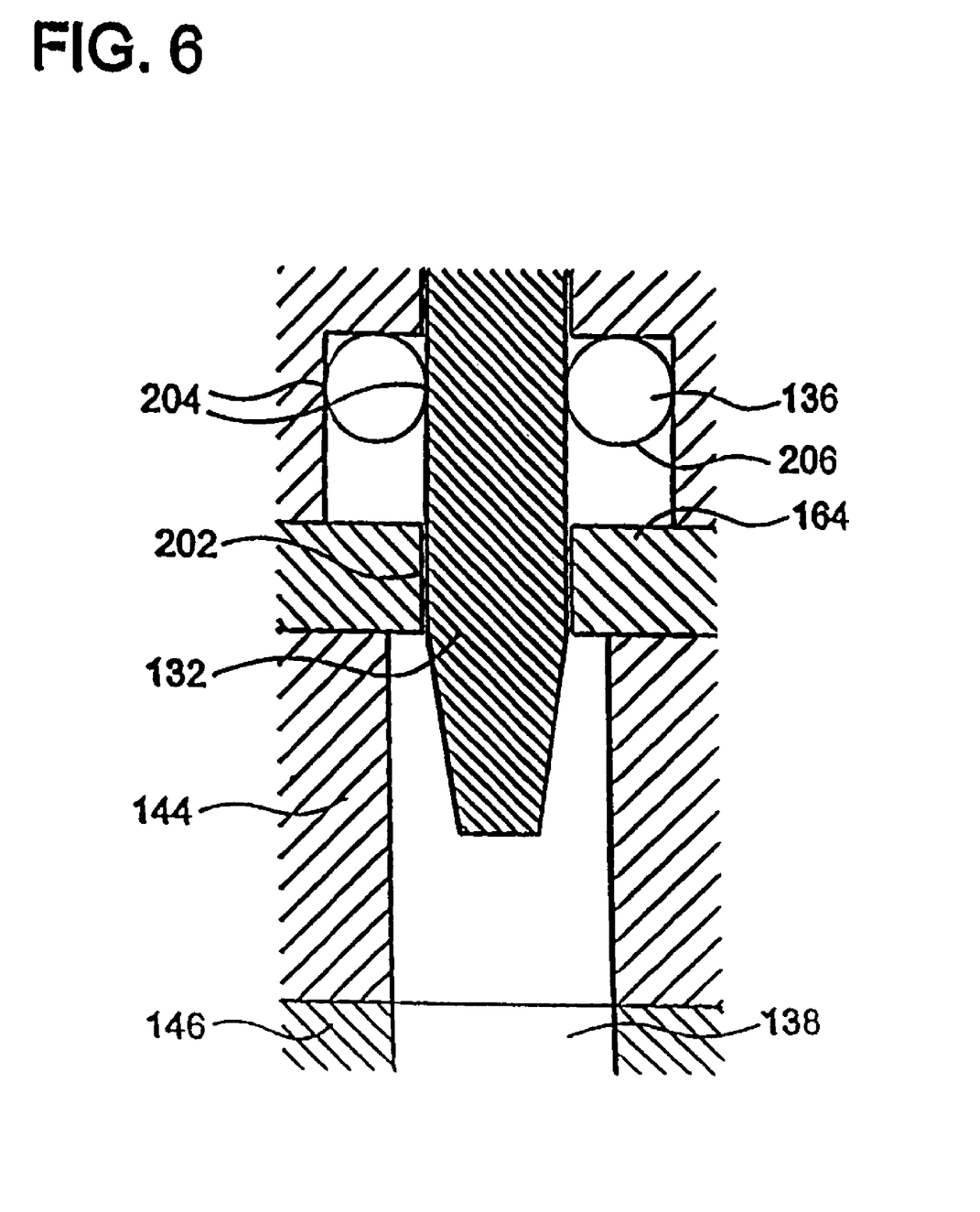
FIG. 6 is an expanded view of a lower section of the surge prevention valve of FIG. 5.

The upper end 160 of the valve rod 106 is fixed within a handle button 104. The lower portion of the valve rod 106 is slidably located within a second bypass space 116 and a valve space 162. The valve rod 106 may have a reduced diameter portion 110 and a conical lower end 132. Except for the reduced diameter portion 110 and the lower end 132, the remainder of the valve rod 106 may have a circular cross-section with a substantially constant diameter. The cross-sectional configuration of the valve rod 106 is such that the o-ring 136 of the first bypass space 138 seals the second bypass 116 from the first bypass 138 by the lower end 132 of the rod 106 in the position shown in FIG. 5. As shown in FIG. 6, the o-ring 136 combined with the lower end 132 of the valve rod 106 may be the only components forming the seal 204 between the first bypass space 138 and the second bypass space 116. Moreover, a continuous passageway 202 is provided between the first bypass space 138 and the exposed lower surface of the o-ring 136 regardless of the location of the valve rod 106. Thus, gas may pass through the upper opening 164. In the illustrated system, the upper opening 164 serves as a backup plate which keeps o-ring 136 from being blown into opening 128 in the event that someone tries to fill the gas source 16, without first opening valve 100.

Figure 7:
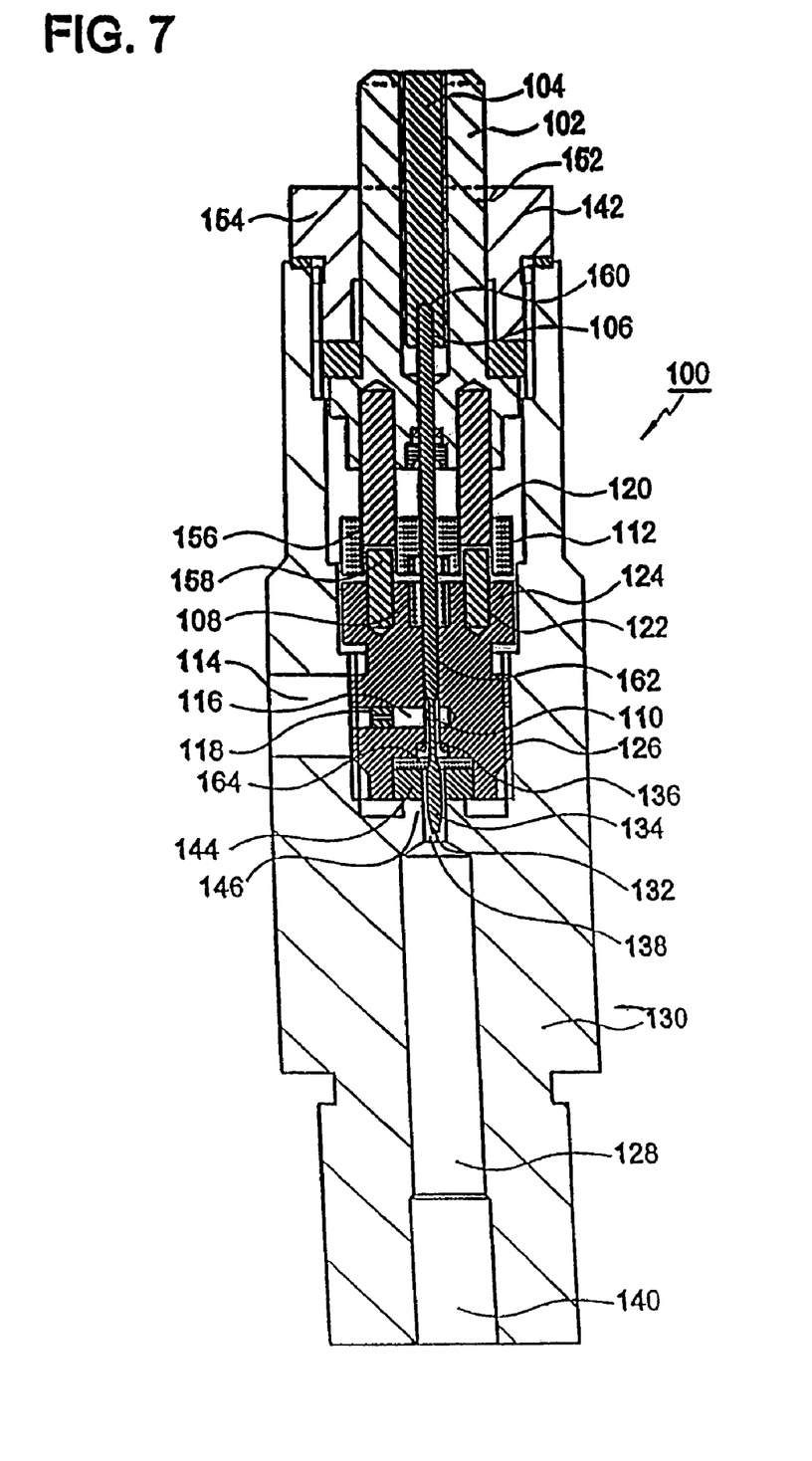
FIG. 7 is another cross sectional view of the surge prevention valve of FIG. 5, at a subsequent stage of operation.

As discussed in more detail below, the valve rod 106 may be moved down and through the seal unit 124 to the position shown in FIG. 7. In the FIG. 7 position, the reduced diameter portion 110 is located in the first and second bypass spaces 138, 116. The cross-sectional area of the reduced diameter portion 110 is less than that of the first and second bypasses 138, 116. Consequently, oxygen may flow through the first and second bypass openings 138, 116 when the valve rod 106 is in the FIG. 7 position.

The seal unit 124 is connected to the housing 130 by suitable threads 126. The threads 126 are arranged such that rotating the seal unit 124 with respect to the housing 130 in a first direction moves the seal pad 144 into sealing engagement with the valve seat 146. Rotating the seal unit 124 in the opposite direction causes the seal pad 144 to move away from the valve seat 146 to the open position shown in FIG. 8. In the open position, oxygen is allowed to flow through the valve seat 146, around the seal unit 124 in the direction of arrow 170 and into the outlet 114.

The actuator unit 142 has a handle button 104, a handle 102 surrounding the handle button 104, a socket structure 112, and a handle cover 154. The handle button 104 and the socket structure 112 are biased upwardly (away from the seal unit 124) by a coil spring 108. The cover 154 may be threaded into the housing 130, if desired.

A torque unit is formed by pins 120, 156 formed in the handle 152 and pins 122, 158 fixed with respect to the seal unit 124 together with socket structure 112. As shown in FIG. 7, the four pins 122, 158, 120, 156 may be received by the socket structure 112 when the handle button 104 is pushed downwardly against the bias of the spring 108. In the FIG. 7 position, the socket structure 112 causes the pins 122, 158, 120, 156 to move as one unit. Therefore, a torque applied to the handle 102 may be transmitted to the seal unit 124. Thus, a torque may be manually applied to the handle 102 in a first direction to cause the seal unit 124 to move further down into the housing 130 to press the seal pad 144 into the sealed position shown in FIG. 7. In addition, a torque may be applied in the opposite direction to threadedly move the seal pad 144 away from the valve seat 146 to the open position shown in FIG. 8.

The valve 100 is closed in the position shown in FIG. 5. In the closed position, oxygen cannot flow between the seal pad 144 and the valve seat 146. In addition, in the closed position, the o-ring 136 and the valve rod 106 seal the first bypass space 138, such that oxygen cannot flow into the second bypass space 116. As noted above, a suitable o-ring 136 may be provided to form a gas-tight seal against the valve rod 106 in the upper opening 164, if desired.

Figure 8:
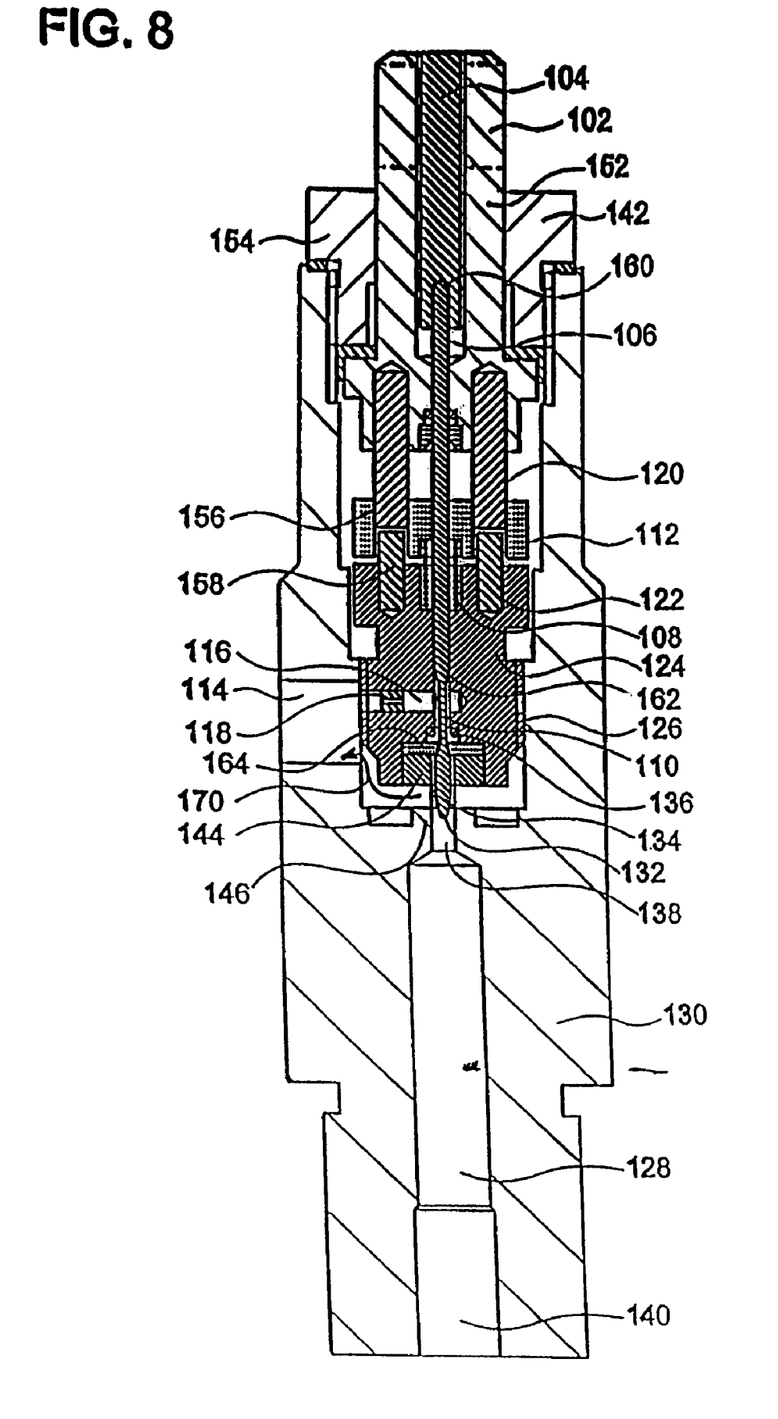
FIG. 8 is yet another cross sectional view of the surge prevention valve of FIG. 5, at yet another stage of operation.

The valve 100 is open in the position shown in FIG. 8. In the open position, as mentioned above, oxygen can flow through the valve seat 146, around the seal unit 124 in the direction of arrow 170, and through the valve outlet 114. To move the valve 100 from the closed position to the open position, the user first pushes down manually on the handle button 104, against the bias of the spring 108. Since the socket structure 112 is integrated with the valve rod 106, the socket structure 112 also moves down to the enclosing position against the bias of the spring 108. The socket structure 112 may be fixed with respect to the valve rod 106 by a force fit or by adhesive, for example.

Pushing down on the handle button 104 causes the valve rod 106 to move axially toward the seal unit 124 and causes the pins 122, 158, 120, 156 to become engaged within the socket structure 112. Then the user applies torque to the handle 102 in an opening rotational direction to threadedly rotate the seal unit 124 away from the valve seat 146. The torque is transmitted through the handle 102 and through the torque unit 112, 120, 122, 156, 158, to rotate the threaded seal unit 124. In the illustrated arrangement, the seal unit 124 cannot be rotated by the handle 102 unless the torque unit 112, 120, 122, 156, 158 is engaged, with the spring 108 in the compressed position shown in FIG. 7. The torque unit 112, 120, 122, 156, 158 is engaged to enable rotation of the seal unit 124. As shown in the drawings, the handle button 104 may be formed as part of the handle 102, and the button 104 may be located conveniently to be operated by the thumb of the hand that grips the handle 102.

Pushing down on the handle button 104 to engage the torque unit 112, 120, 122, 156, 158 causes the reduced diameter portion 110 of the valve rod 106 to move into the upper opening 164 of the first bypass space 138. When the reduced diameter portion 110 is in the upper opening 164, oxygen may flow into the second bypass space 116 and through the bleed passageway 118. Oxygen can start to flow through the upper opening 164 while the handle button 104 is moving downwardly, before the torque unit 112, 120, 122, 156, 158 is fully engaged. In the illustrated arrangement, the handle button 104 must be moved to the intermediate FIG. 7 position before the seal unit 124 can be threadedly lifted from the valve seat 138. Opening the valve 100 requires a two-step sequential push-then-twist operation. If the user does not push down on the handle button 104, the handle 102 merely rotates within the cover 154 without engaging the seal unit 124.

Consequently, the illustrated valve 100 allows oxygen to bleed into the outlet 114 through the bleed passageway 118 before the seal pad 144 is moved away from the valve seat 146. The small amount of oxygen that bleeds through the restricted passageway 118 during the short time required to engage the torque unit 112, 120, 122, 156, 158 may be sufficient to prevent a high pressure surge from developing in the system 10 when the valve 100 is subsequently opened. Thus, the regulator 12 (FIG. 1) may be filled at a relatively slow, controlled rate before a full flow of high pressure oxygen is allowed through the valve 100. The oxygen flow rate through the valve seat 146 in the valve open position (FIG. 8) may be much greater than the flow rate through the bleed passageway 118 in the intermediate position shown in FIG. 7.

In the preferred method of operation, the user will first push handle button 104 until the pressure stabilizes in the valve 100. The time it takes to push the handle button 104 down to enable opening of the valve 100 may be sufficient for the desired gradual pressurization of the regulator 12. The ability of the valve 100 to bleed sufficient oxygen into the outlet 114 in the available time may be controlled, for example, by selecting a suitable cross-sectional area for the bleed passageway 118.

In the open position shown in FIG. 8, substantially all of the oxygen flowing through the valve 100 travels in the direction of arrow 170 and not through the bleed passageway 118. Consequently, the bleed passageway 118 does not tend to become occluded by small contaminant particles entrained in the gas flow. If the bleed passageway 118 becomes plugged, the valve 100 will still be operable so that oxygen is still supplied to the intended operative device.

To close the valve 100, the user may grip the handle 102 and simultaneously depress the handle button 104, against the bias of the spring 108, to engage the torque unit 112, 120, 122, 156, 158. Then, while the spring 108 is compressed, the user manually twists the handle 102 to threadedly move the seal unit 124 back into sealing contact with the valve seat 146. Then the downward pressure on the handle button 104 is released, such that the spring 108 draws the end 132 of the valve rod 106 back into a sealed position with o-ring 136 within the upper opening 164 of the first bypass space 138.

Figure 9:
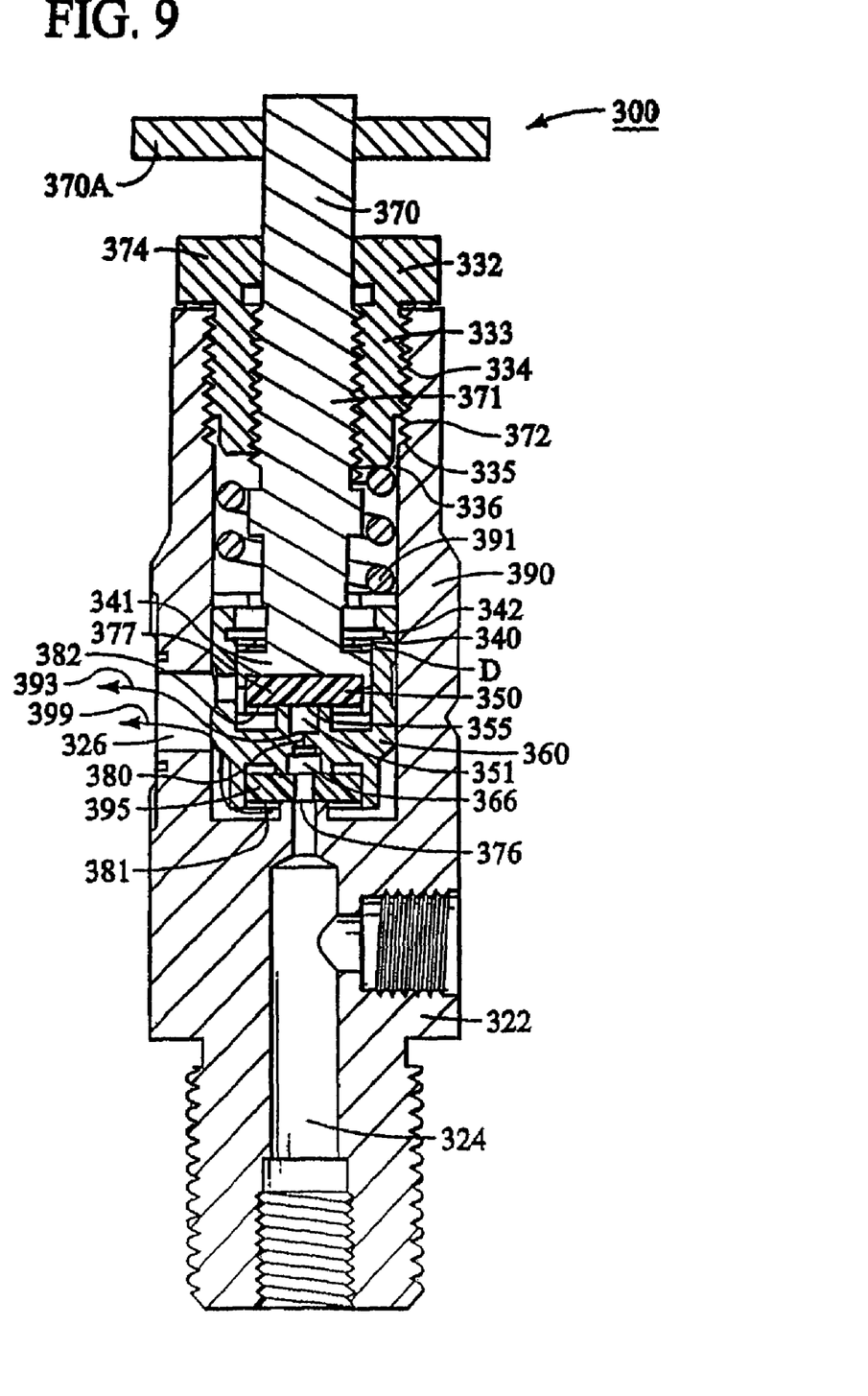
FIG. 9 is a cross sectional view of a dual-port surge prevention valve constructed in accordance with another embodiment of the present invention.

FIG. 9 illustrates a dual-port (or dual-path) valve 300 constructed in accordance with another embodiment of the present invention. As illustrated in FIG. 9, the dual-port (or dual-path) valve 300 includes a housing 322 having an inlet 324 and an outlet 326. The inlet 324 may be connected to the oxygen source 16 (FIG. 1). The outlet 326 may be connected to the pressure regulator 12 (FIG. 1). The housing 322 is preferably provided with wrench flats (not shown). The dual-port (or dual-path) valve 300 further includes an actuator unit 332, which in turn is provided with a cover 374 and an actuator body 333. The actuator body 333 has an inner surface 335 which is provided with threads 336. The actuator body 333 is connected to the housing 332 by suitable threads 334. The lower end surface of the actuator body 333 provides an upper limit for a coil compression spring 391.

As also illustrated in FIG. 9, the actuator unit 332 has a piston unit 370 which is rotatably and threadedly located in the cover 374. A threaded center section 371 of the piston unit 370 is connected to the actuator body 333 by suitable threads 372 corresponding to the threads 336 of the inner surface 335. As described in more detail below, the piston unit 370 is rotatable within the actuator body 333.

A lower portion 377 of the piston unit 370 is slidably located within a space 340 of a lower cup-shaped valve element 360, which in turn is located within the housing 322. The lower portion 377 of the piston unit 370 is provided with an elastomeric upper seat 350 which rests on a first valve seat 351 of a first (upper) valve 355. A washer 341 is located on the upper surface of the lower portion 377 of the piston unit 370. Except for the lower portion 377 of the piston unit 370, the remainder of the piston unit 370 may have a cross-section with a substantially constant diameter. (The terms "upper" and "lower" are relative terms used herein for convenience in connection with FIG. 9. The device of FIG. 9 will operate in a horizontal position as well as in other orientations besides that shown in FIG. 9.)

The lower cup-shaped valve element 360 is further provided with a second (lower) valve 366 comprising a lower elastomeric, annular seat 395 which rests on a second annular valve seat 376. The first (upper) valve 355 and the second (lower) valve 366 integrate a pressurization control orifice 380. The lower cup-shaped valve element 360 is further provided with a lower stem seat 390 which is biased downwardly by the coil compression spring 391. Annular elastomeric seal pads 381 and 382 may be provided for sealing against the first valve seat 351 and the second valve seat 376, respectively.

The valve 300 is closed in the position shown in FIG. 9. In the closed position, oxygen cannot flow between the seal pad 381 and the second valve seat 376. In addition, in the closed position, the first valve seat 351 seals the upper portion of the pressurization control orifice 380. In the closed position, oxygen cannot bleed upwardly through the small control orifice 380.

In operation, the valve 300 is initially opened by rotating the threaded center post 371 of the piston unit 370 upward. A suitable handle 370A for rotating the piston unit 370 may be attached to the top end of the piston unit 370. When the user first rotates the threaded center section 371, the upper seat 350 moves upwardly, in an axial direction. As a result, the first (upper) valve 355 opens and allows the pressurization control orifice 380 to be in fluid communication with the outlet 326. This, in turn, will open a first flow path in the direction of arrow 393 and allow oxygen to flow at a reduced rate.

As the user further rotates the threaded center section 371, the lower portion 377 of the piston unit 370 continues to move upwardly in an axial direction, and travels a distance "D" which is the height of the space 340 of the lower cup-shaped valve element 360. This way, the upper surface of the washer 341 contacts retaining clip 342 of the lower cup-shaped valve element 360 so that the lower portion 377 of the piston unit 370 interlocks with the retaining clip 342 in a first axial position.

The time it takes the lower portion 377 of the piston unit 370 to travel the distance D within the space 340 to the first axial position may be sufficient for the slow and gradual pressurization of the regulator 12 (FIG. 1). The time it takes the lower portion 377 of the piston unit 370 to travel the distance D to the first axial position, and thus to completely open the first (upper) valve 355 and to start opening the second (lower) valve 366, is preferably in the range of about 0.25 seconds to about 1.5 seconds, and more preferably in the range of about 0.5 seconds to about 1.25 seconds. The above range of time required for the complete opening of the first (upper) valve 355 can, if desired, be correlated to the amount of handle rotation required to start the opening of the second valve 366, by controlling the spacing (pitch) of the engaged threads 372, 336 of the actuator body 333 and inner surface 335.

For example, the spacing (pitch) of the threads 372, 336 may be set such that the piston unit 370 has to be rotated in the range of at least about 270 degrees to about 450 degrees, more preferably at least about 270 degrees to about 360 degrees, to allow the second (lower) valve 366 to start opening. To rotate the piston unit 370 through at least 270 degrees, a typical user is required to remove his/her hand from the oxygen tank valve handle 370A and to re-grip the handle 370A to complete the opening process. It would be awkward and unusual for the typical user to rotate the handle 370A through 270 degrees without removing his or her hand from the handle 370A at least once. The time it takes the typical operator to release and re-grip the handle 370A, to accomplish rotation of the handle through 270 degrees or more, is at least about 0.25 seconds. Accordingly, in the preferred embodiment of the invention, the time it takes the piston unit 370 to rotate through at least about 270 degrees, to start the opening of the second (lower) valve 366 is at least 0.25 seconds.

The ability of the first (upper) valve 355 to bleed sufficient oxygen into the outlet 326 may be further controlled, for example, by selecting a suitable cross-sectional area for the pressurization control orifice 380. In any event, the regulator 12 (FIG. 1) may be filled at a relatively slow and controlled rate before a full flow of high pressure oxygen is allowed through the valve 300.

While the piston unit 370 travels distance D within the space 340 to the first axial position, the coil compression spring 391 holds the lower stem seat 390 of the lower cup-shaped valve element 360 in a closed position (biased downwardly against the second valve seat 376). As a result, the second valve seat 376 of the second (lower) valve 366 remains closed and oxygen cannot flow between the seal pad 381 and the second valve seat 376.

As the user subsequently rotates the threaded center section 371, the lower cup-shaped valve element 360, which becomes interlocked with the lower portion of the piston unit 370 through retaining clip 342, is retracted from the first axial position (i.e., the illustrated position) to a second axial position. Consequently, the lower seat 395 lifts off the second valve seat 376 and the second (lower) valve 366 is open. This way, in the full open position, substantially all of the oxygen is allowed to flow through the second (lower) valve 366 of the dual-port valve 300 in the direction of arrow 399.

The multi-path valve 300 of FIG. 9 provides a controlled pressurization of gases and prevents a high pressure surge from occurring in the pressure regulator 12 (FIG. 1) when the valve 300 is initially opened. The controlled initial bleeding of the gas through the pressurization control orifice 380 (FIG. 9) delays the time in which the gas (e.g. oxygen) reaches full recompression. This, in turn, provides time for the heat generated by the recompression of the gas to be dispersed. By preventing high pressure surges and by dispersing heat during gas recompression, the occurrence of excessive heat is avoided and, consequently, the possibility of ignition of the valve and/or regulator is substantially eliminated.

Figure 10:
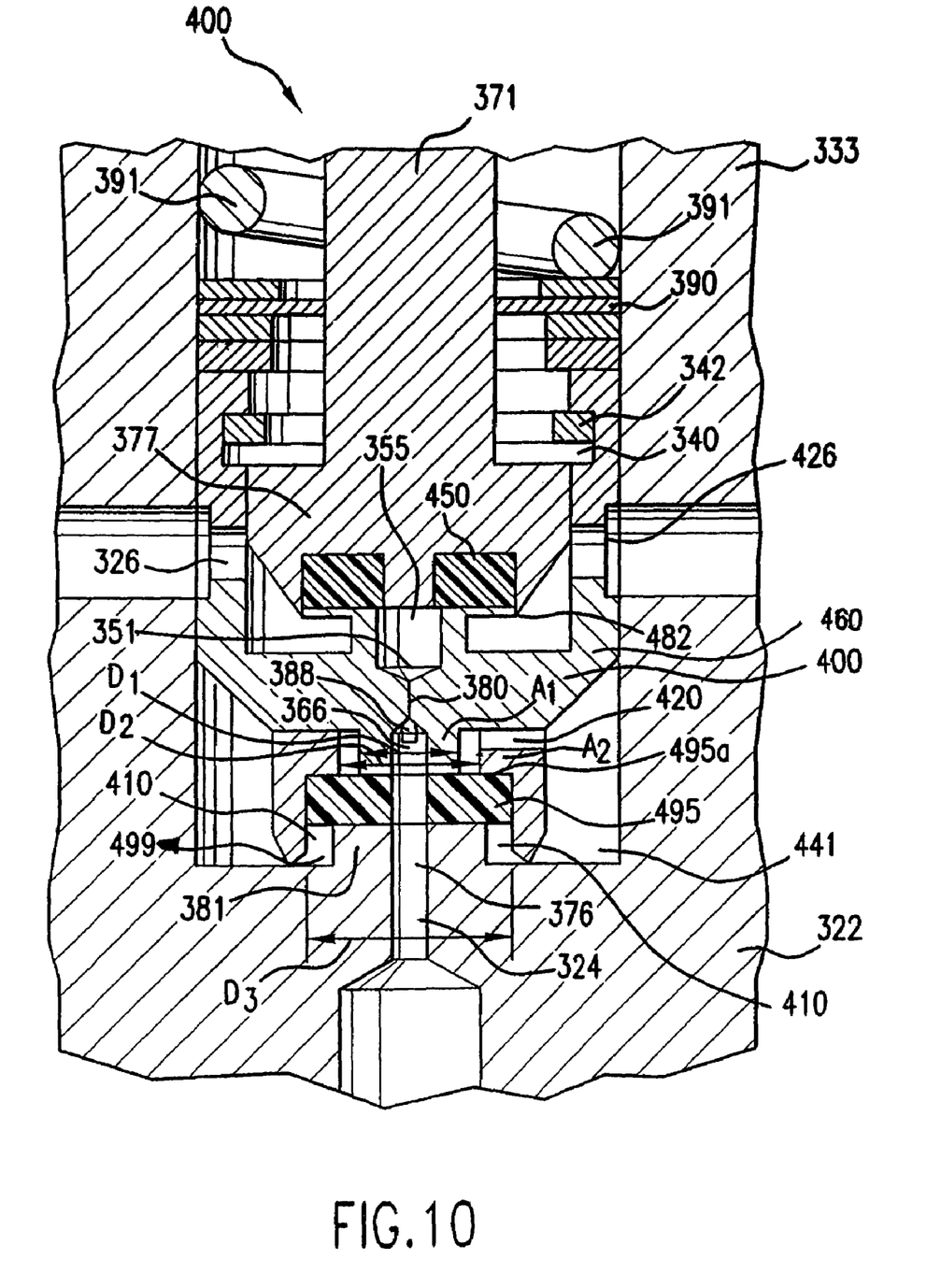
FIG. 10 is a cross-sectional view of a dual-port surge prevention valve constructed in accordance with another embodiment of the present invention.

FIG. 10 illustrates a dual-port (or dual-path) valve 400 constructed in accordance with another embodiment of the present invention. The dual-port (or dual-path) valve 400 is similar to the valve 300 of FIG. 9 to the extent that the first (upper) valve 355 and the second (lower) valve 366 integrate or enclose a narrow passageway 380. As described in more detail below, however, the dual-port (or dual-path) valve 400 of FIG. 10 has additional features and structures for venting pressurized oxygen supplied by the oxygen source 16 (FIG. 1) away from a top surface 495a of the second (lower) valve 366.

As illustrated in FIG. 10, the valve 400 includes housing 322 having an inlet 324 and an outlet 326. As in the previously described embodiment, the inlet 324 may be connected to the oxygen source 16 (FIG. 1) and the outlet 326 may be connected to the pressure regulator 12 (FIG. 1). The inlet 324 may have a diameter as small as possible, but not smaller than CGA V-1 Standards (October 1994, revised January 1996). The valve 400 further includes an actuator unit 332, which in turn is provided with a cover 374 (FIG. 9) and an actuator body 333. The lower end surface of the actuator body 333 provides an upper limit for the coil compression spring 391. As also illustrated in FIG. 10, a threaded center section 371 of the piston unit 370 is connected to the actuator body 333 by suitable threads. As described above with reference to the valve 300 of FIG. 9, the piston unit 370 is rotatable within the actuator body 333.

The lower portion 377 of the piston unit 370 is slidably located within space 340 of a lower cup-shaped valve element 460, which in turn is located within the housing 322. The lower-cup shaped valve element 460 is further provided with a lower stem seat 390 which is biased downwardly by the coil compression spring 391. The lower portion 377 of the piston unit 370 is also provided with an annular elastomeric upper seat 450 which rests on a first valve seat 351 of a first (upper) valve 355. As illustrated in FIG. 10, the annular elastomeric upper seat 450 has a ring shape configuration that confers a localized yet uniform pressure upon the edges of the first valve seat 351 of the first (upper) valve 355. In this manner, the force that can be exerted on the first valve seat 351 is exerted only upon the edges of the seat, thereby increasing the localized pressure exerted upon the first (upper) valve 355.

As also illustrated in FIG. 10, there is a second outlet 426 provided within the actuator body 333. The second outlet 426 may provide an additional path to a pressure regulator, such as the pressure regulator 12 of FIG. 1.

The lower-cup shaped valve element 460 of FIG. 10 is further provided with a second (lower) valve 366. The lower valve 366 includes a ring-shaped elastomeric element 495. When the valve 366 is closed, the ring-shaped elastomeric element 495 rests on a second valve seat 376. An annular sealing groove 410 is located adjacent to the upper surface 495a of the ring-shaped elastomeric element 495. A vent orifice 420 is connected to the annular sealing groove 410. The vent orifice 420 extends from the annular sealing groove 410 to a lower seat area 441. The vent orifice 420 allows oxygen to flow from the sealing groove 410 to the lower seat area 441. The lower valve 366 also includes a filter element 388, which prevents debris and contaminated impurities and particles from entering the vent orifice 420.

During the opening of the first (upper) valve 355 but before the opening of the second (lower) valve 366, oxygen might be able to leak out of the cylinder 16 (FIG. 1) through space between the top surface of the ring-shaped elastomeric element 495 and an adjacent bottom surface of the valve element 460. The high pressure oxygen (if it were not vented) could tend to push the elastomeric element 495 out of the valve element (downward as shown in FIG. 10). By providing the annular sealing groove 410 in communication with the vent orifice 420 and the lower seat area 441, the high pressure oxygen is vented into the lower seat area 441.

Thus, ring-shaped area $A_1$ (FIG. 10) defined within the inner diameter $D_1$ (FIG. 10) of the sealing groove 410 is the only area that can be subjected to a high pressure from leaking oxygen. The groove 410 and the radially extending vent orifice 420 operate as a pressure relief passageway to prevent a high differential pressure from accumulating over the rest of the surface of the elastomeric element 495, in other words, area $A_2$ (FIG. 10) defined between the periphery of the elastomeric element 495 (having diameter $D_3$) and the periphery of the sealing groove 410 (having diameter $D_2$), will remain at the same pressure as the lower seat area 441. Accordingly, oxygen in the area $A_2$ cannot exert any downward force upon the elastomeric element 495.

In addition, the inner diameter $D_1$ of the sealing groove 410 can be selected so that the equal but opposite upward force applied to the valve element 460 by high pressure oxygen cannot overcome the force exerted by the coil compression spring 391. This additional feature prevents the lower elastomeric seat 495 from coming out of its illustrated location within the valve element 460. A lower annular edge of the valve element 460 surrounds the lower surface of the elastomeric element 495. The lower annular edge (made of metal) can be crimped radially inwardly to secure the elastomeric element 495 in its illustrated location. The venting system 410, 420 can be especially usefull if the device 400 is made with either a poor crimp or no crimp at all, and it also provides safety advantages. If there is no crimp applied to the elastomeric element 495, then the venting system 410, 420 can help ensure that the elastomeric element 495 stays in its desired position.

As the user further rotates the threaded center section 371, the lower-cup shaped valve element 460 becomes interlocked with the lower portion of the piston unit 370 and consequently the lower seat 495 lifts off the second valve seat 376 and the second (lower) valve 366 is open. Thus, in full open position, substantially all of the oxygen is allowed to flow through the second (lower) valve 366 of the dual-port valve 400 in the direction of arrow 499.

Figure 11:
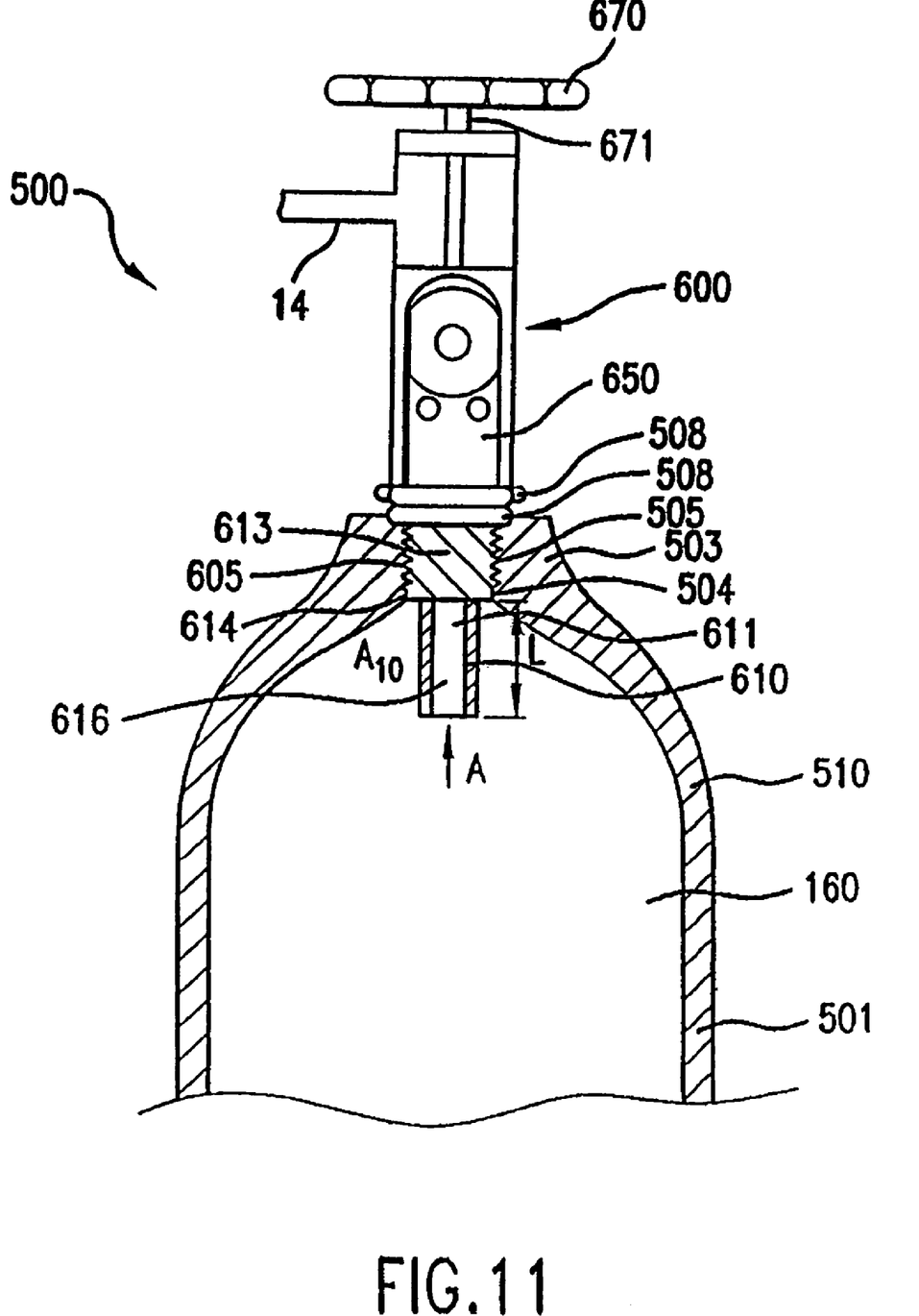
FIG. 11 is a cross-sectional view of an oxygen supply system constructed in accordance with another embodiment of the invention.

FIG. 11 illustrates yet another embodiment of the invention, according to which gas supply system 500 is provided with a valve system 600 that prevents particles and/or impurities from entering the valve system. As illustrated in FIG. 11, the gas supply system 500 includes a source of gas 160 and a conduit 14 for flowing gas from the source of gas 160 to a patient (not illustrated). As shown in FIG. 11, the source of gas 160 may be an oxygen source, for example. The source of gas 160 of FIG. 11 includes a gas container, for example a cylinder 510 which includes a lower cylinder portion 501 and an upper cylinder portion 503 which has a smaller diameter than the diameter of the lower cylinder portion 501. The upper cylinder portion 503 has an inner surface 504 which is provided with threads 505.

The valve system 600 comprises a valve unit 650 and a valve inlet 610. The valve unit 650 may comprise any of the valves 20, 100, 200, 300 and 400, respectively, described above with reference to FIGS. 2-10. For example, the valve unit 650 may include the dual-port (or dual-path) valve 300 shown in FIG. 9.

As illustrated in FIG. 11, the valve inlet 610 has a tubular part 611 connected to a threaded element 613. The tubular part 611 has a tubular configuration with a circular cross-section with a substantially constant diameter. However, the tubular part 611 may have various configurations, for example, rectangular, trapezoidal or elipsoidal, among many others. As shown in FIG. 11, the tubular part 611 extends into the gas cylinder 510. The tubular part 611 is provided with a gas passageway 616. The tubular part 611 may have a length L (FIG. 11) of about 0.5 cm to about 10 cm, more preferably about 1 cm to about 2 cm (for a standard gas cylinder).

The threaded element 613 (FIG. 11) has an outer surface 614 which is provided with suitable threads 605 that correspond to the threads 505 of the upper cylinder portion 503 of the cylinder 510. As illustrated in FIG. 11, the threaded element 613 is connected to the valve unit 650 by seat 507 and annular element 508.

The above-described embodiment provides the advantage that, when the gas supply system 500 is rotated in any of the three directions relative to the position of FIG. 11, particles and/or impurities, such as metal scale, dust, etc., contained within the oxygen 160 are not caught in the oxygen stream that flows from the oxygen cylinder 510 and into gas passageway 616. For example, when the gas supply system 500 is turned upside down relative to the position of FIG. 11, the contaminant particles are not caught in the oxygen stream flowing in the direction of arrow A (FIG. 11), but rather accumulate in the region $A_{10}$ defined by the inner surface of the upper cylinder portion 503 and the outer surface of the tubular part 611. In this manner, the particles and/or impurities are trapped in the region $A_{10}$, cannot enter the gas passageway 616, and the valve orifices do not become plugged.

Although the embodiments of the present invention have been described above with reference to a supply system for oxygen, the invention is not limited to oxygen or to an oxygen supply system. Thus, the invention is also applicable to other gases, compositions of gases or gas systems, including but not limited to nitrous oxide and other gases mentioned in CGA V-1 Standards (October 1994, revised January 1996).

The above description and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the invention.

What is claimed as new and desired to be protected by Letters Patent of the United States is:

1. A method of operating a medical oxygen delivery system, the method comprising the steps of:
   providing a cylinder containing oxygen;
   providing a medical device for delivering the oxygen to a patient;
   providing a valve between the oxygen cylinder and the medical device, the valve having a stem with a reduced diameter portion;

opening the valve to a partially open condition by moving the stem in a first axial direction to allow the oxygen to flow through a first flow path and at a first flow rate; and subsequently, opening the valve to allow the oxygen to flow through a second flow path at a second flow rate, the second flow rate being greater than the first flow rate.

2. The method of claim 1, further comprising the steps of pushing at least a portion of a handle in the first axial direction to open the valve to the partially open condition, and rotating the handle to open the valve.

3. The method of claim 2, wherein the handle includes a button that moves in the first axial direction and a handle member that moves in a second direction.

4. The method of claim 3, wherein the second direction is a rotational direction.

5. The method of claim 2, further comprising an engagement torque unit for transmitting torque from the handle to open the valve.

* * * * *